United States Patent
Hu et al.

(10) Patent No.: US 12,555,573 B2
(45) Date of Patent: Feb. 17, 2026

(54) MIXTURE-OF-EXPERT CONFORMER FOR STREAMING MULTILINGUAL ASR

(71) Applicant: Google LLC, Mountain View, CA (US)

(72) Inventors: Ke Hu, Stony Brook, NY (US); Bo Li, Santa Clara, CA (US); Tara N. Sainath, Jersey City, NJ (US); Yu Zhang, Mountain View, CA (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 18/598,885

(22) Filed: Mar. 7, 2024

(65) Prior Publication Data

US 2024/0304185 A1    Sep. 12, 2024

Related U.S. Application Data

(60) Provisional application No. 63/489,167, filed on Mar. 8, 2023.

(51) Int. Cl.
*G10L 15/197*    (2013.01)
*G10L 15/02*    (2006.01)
*G10L 15/06*    (2013.01)

(52) U.S. Cl.
CPC ............ *G10L 15/197* (2013.01); *G10L 15/02* (2013.01); *G10L 15/063* (2013.01)

(58) Field of Classification Search
CPC ..... G10L 15/197; G10L 15/02; G10L 15/063; G10L 15/005; G10L 15/32; G10L 15/16; G06N 3/0464; G06N 3/0499; G06N 3/045

(Continued)

(56) References Cited

U.S. PATENT DOCUMENTS 11,003,994 B2 *   5/2021   Liang ................... G06N 3/086
11,182,677 B2 * 11/2021   Rawal .................. G06N 3/0985
(Continued)

OTHER PUBLICATIONS

Ye Bai et al: "Parameter-Efficient Conformers via Sharing Sparsely-Gated Experts for End-to-End Speech Recognition", arxiv.org, Cornell University Library, 201 Olin Library Cornell University Ithaca, NY 14853, Sep. 17, 2022 (Sep. 17, 2022), XP091321903.

(Continued)

*Primary Examiner* — Thuykhanh Le
(74) *Attorney, Agent, or Firm* — Honigman LLP; Brett A. Krueger; Grant Griffith

(57) ABSTRACT

A method of a multilingual ASR model includes receiving a sequence of acoustic frames characterizing an utterance of speech. At a plurality of output steps, the method further includes generating a first higher order feature representation for an acoustic frame by a first encoder that includes a first plurality of multi-head attention layers; generating a second higher order feature representation for a corresponding first higher order feature representation by a second encoder that includes a second plurality of multi-head attention layers; and generating, by a first decoder, a first probability distribution over possible speech recognition hypotheses based on the second higher order feature representation and a sequence of N previous non-blank symbols. A gating layer of each respective MoE layer configured to dynamically route an output from a previous multi-head attention layer at each of the plurality of output steps to a respective pair of feed-forward expert networks.

30 Claims, 6 Drawing Sheets

(58) Field of Classification Search
USPC .......................................................... 704/8
See application file for complete search history.

(56) References Cited

U.S. PATENT DOCUMENTS

| | | | |
|---|---|---|---|
| 11,250,314 B2* | 2/2022 | Meyerson | G06N 3/044 |
| 11,676,006 B2* | 6/2023 | Das | G10L 15/32 |
| | | | 706/20 |
| 11,720,346 B2* | 8/2023 | Wu | G06F 16/24556 |
| | | | 707/741 |
| 12,354,002 B1* | 7/2025 | Weber | G10L 15/22 |
| 12,367,249 B2* | 7/2025 | Sarah | G06N 3/045 |
| 12,417,260 B2* | 9/2025 | Cummings | G06N 3/098 |
| 2018/0114115 A1* | 4/2018 | Liang | G06N 3/0985 |
| 2020/0004777 A1* | 1/2020 | Filgueiras de Araujo | |
| | | | G06V 10/454 |
| 2020/0089755 A1* | 3/2020 | Shazeer | G06N 3/08 |
| 2020/0104746 A1* | 4/2020 | Strope | G06F 16/3344 |
| 2020/0364543 A1* | 11/2020 | Luong | G06N 3/047 |
| 2021/0097368 A1* | 4/2021 | Lin | G06N 3/0464 |
| 2021/0133535 A1* | 5/2021 | Zhao | G06N 3/0455 |
| 2021/0279587 A1* | 9/2021 | Egger | G06F 8/35 |
| 2021/0383584 A1* | 12/2021 | Zhang | G06T 3/40 |
| 2022/0020362 A1* | 1/2022 | Kang | G06N 3/045 |
| 2022/0027668 A1* | 1/2022 | Rhee | G06N 3/08 |
| 2022/0036194 A1* | 2/2022 | Sundaresan | G06N 3/0464 |
| 2022/0075606 A1* | 3/2022 | Park | G06N 3/105 |
| 2022/0092276 A1* | 3/2022 | Tu | G06F 40/30 |
| 2022/0122582 A1* | 4/2022 | Elias | G06N 3/0464 |
| 2022/0172028 A1* | 6/2022 | Qian | G06F 17/153 |
| 2022/0187847 A1* | 6/2022 | Cella | G05B 19/41885 |
| 2022/0197306 A1* | 6/2022 | Cella | G06N 20/10 |
| 2022/0237436 A1* | 7/2022 | Shin | G06N 3/0442 |
| 2022/0237487 A1* | 7/2022 | Kim | G06N 3/04 |
| 2022/0253672 A1* | 8/2022 | Chowdhery | G06N 3/082 |
| 2022/0253682 A1* | 8/2022 | Lee | G06N 3/04 |
| 2022/0261644 A1* | 8/2022 | Cho | G06N 3/09 |
| 2022/0261649 A1* | 8/2022 | Gao | G06N 3/0442 |
| 2022/0301543 A1* | 9/2022 | Elias | G06N 3/088 |
| 2022/0406324 A1* | 12/2022 | Shin | G06N 3/0455 |
| 2023/0058341 A1* | 2/2023 | Lee | G06N 3/09 |
| 2023/0086316 A1* | 3/2023 | Ostapenko | G06F 13/28 |
| | | | 706/42 |
| 2023/0118505 A1* | 4/2023 | Lee | G06N 3/0475 |
| | | | 706/15 |
| 2023/0123322 A1* | 4/2023 | Cella | G05B 23/0283 |
| | | | 700/29 |
| 2023/0127651 A1* | 4/2023 | Cella | G06N 3/045 |
| | | | 705/7.11 |
| 2023/0143371 A1* | 5/2023 | Jung | G06N 3/045 |
| | | | 708/670 |
| 2023/0173395 A1* | 6/2023 | Cella | G06N 3/0455 |
| | | | 463/25 |
| 2023/0222454 A1* | 7/2023 | Cella | G06Q 10/06315 |
| | | | 705/28 |
| 2024/0184630 A1* | 6/2024 | Ahn | G06F 9/5027 |
| 2024/0203119 A1* | 6/2024 | Ma | G06V 20/188 |
| 2024/0252106 A1* | 8/2024 | Yang | G10L 25/66 |
| 2024/0273371 A1* | 8/2024 | Chen | G06N 3/082 |
| 2024/0290323 A1* | 8/2024 | Huang | G10L 15/197 |
| 2024/0420684 A1* | 12/2024 | Zou | G10L 15/02 |
| 2025/0077979 A1* | 3/2025 | Li | H04L 67/306 |

OTHER PUBLICATIONS

Kenichi Kumatani et al: "Building a great multi-lingual teacher with sparsely-gated mixture of experts for speech recognition", arxiv.org, Cornell University Library, 201 Olin Library Cornell University Ithaca, NY 14853, Dec. 10, 2021 (Dec. 10, 2021), XP091116672.

Noam Shazeer et al: "Outrageously Large Neural Networks: The Sparsely-Gated Mixture-of-Experts Layer", arxiv.org, Cornell University Library, 201 Olin Library Cornell University Ithaca, NY 14853, Jan. 23, 2017 (Jan. 23, 2017), XP080750950.

International Search Report and Written Opinion issued in related PCT Application No. PCT/US2024/018806, dated May 16, 2024.

* cited by examiner

MIXTURE-OF-EXPERT CONFORMER FOR STREAMING MULTILINGUAL ASR

CROSS REFERENCE TO RELATED APPLICATIONS

This U.S. patent application claims priority under 35 U.S.C. § 119(e) to U.S. Provisional Application No. 63/489,167, filed on Mar. 8, 2023. The disclosure of this prior application is considered part of the disclosure of this application and is hereby incorporated by reference in its entirety.

TECHNICAL FIELD

This disclosure relates to mixture-of-expert conformer for streaming multilingual ASR.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the client speaking and the transcription) based on the ongoing development of deep neural networks. However, one challenge in developing deep learning-based ASR models is that deep neural networks benefit from being over-parameterized such that the ASR models include well over 100 million parameters and require hundreds of thousands of training steps to converge. As a result, training these over-parameterized ASR models is a resource intensive process that may not be suitable for devices with limited computing resources and memory.

SUMMARY

One aspect of the disclosure provides a multilingual automated speech recognition (ASR) model that includes a first encoder configured to receive a sequence of acoustic frames characterizing an utterance of speech as input, and generate, at each of a plurality of output steps, a first higher order feature representation for a corresponding acoustic frame in the sequence of acoustic frames. Here, the first encoder includes a first plurality of multi-head attention layers. The multilingual ASR model also includes a second encoder configured to receive the first higher order feature representation generated by the first encoder at each of the plurality of output steps as input, and generate, at each of the plurality of output steps, a second higher order feature representation for a corresponding first higher order feature frame. Here, the second encoder is cascaded to the first encoder and includes a second plurality of multi-head attention layers. The multilingual ASR model also includes a first decoder configured to receive, as input, the second higher order feature representation generated by the second encoder at each of the plurality of output steps and a sequence of N previous non-blank symbols output by a final softmax layer at each of the plurality of output steps, and generate, at each of the plurality of output steps, a first probability distribution over possible speech recognition hypotheses. Each multi-head attention layer in the first and second pluralities of multi-head attention layers includes an initial feed-forward network, a multi-headed self-attention layer, a convolution layer, and a final feed-forward network. At least one of the initial feed-forward network or the final feed-forward network of at least one corresponding multi-head attention layer in the second plurality of multi-head attention layers includes a respective mixture-of-experts (MoE) layer, where each respective MoE layer includes a gating layer and multiple feed-forward expert networks. The gating layer of each respective MoE layer is configured to dynamically route an output from a previous multi-head attention layer at each of the plurality of output steps to a respective pair of feed-forward expert networks among the multiple feed-forward expert networks that includes the highest weights among the multiple feed-forward expert networks at the corresponding multi-head attention layer in the second plurality of multi-head attention layers without routing the output to the other feed-forward expert networks among the multiple feed-forward expert networks.

Implementations of the disclosure may include one or more of the following optional features. In some implementations, each initial feed-forward network in the second plurality of multi-head attention layers includes the respective MoE layer. Each final feed-forward network in the second plurality of multi-head attention layers may include the respective MoE layer. Each feed-forward expert network among the multiple feed-forward expert networks of the respective MoE layer may include a single feed-forward network layer. In some implementations, the gating layer of the respective MoE layer does not rely on any language information associated with the sequence of audio frames that characterizes the utterance when dynamically routing the output from the previous multi-head attention layer at each of the plurality of output steps to the respective pair of feed-forward expert networks.

In some examples, the gating layer of the respective MoE layer is configured to determine a respective weight for each corresponding feed-forward expert network among the multiple feed-forward expert networks at each of the plurality of output steps based on $g_i = \text{Softmax}(W_l \cdot x)$. Here, x includes the output of the previous layer at the corresponding output step, $W_l$ includes a weight matrix for the gate layer at the corresponding lth multi-head attention layer, and g includes the respective weight for the corresponding feed-forward expert network. Each feed-forward expert network in the pair of feed-forward expert networks including the highest weights may be configured to determine a respective output based on the output routed by the gating layer from the previous multi-head attention layer, and the respective MoE layer is configured to determine a MoE output based on a sum of the respective outputs determined by the pair of the feed-forward expert networks that include the highest weights.

In some implementations, the multilingual ASR model further includes a second decoder configured to receive, as input, the first higher order feature representation generated by the first encoder at each of the plurality of output steps and generate, at each of the plurality of output steps, a second probability distribution over possible speech recognition hypotheses. Here, the second decoder may be further configured to generate partial speech recognition results based on the second probability distribution over possible speech recognition hypotheses. In these implementations: the first decoder and the second decoder may each include a corresponding prediction network followed by a corresponding joint network; the corresponding prediction networks of the first and second decoders have a same structure including one of a long short-term memory (LSTM)-based prediction network or a V2 embedding look-up table; and the corresponding joint networks of the first and second decoders include a same structure.

In some examples, the second encoder generates the second higher order feature representation without receiving any of the acoustic frames as input. The first encoder may include a causal encoder. The second encoder may include a non-causal encoder. The first encoder and the second encoder may be trained jointly on a set of multilingual training utterances using a negative log-likelihood. In some implementations, the respective MoE layer is trained on an auxiliary loss to encourage load balancing across the multiple feed-forward expert networks and the auxiliary loss is based on an average gates over all frames for each corresponding feed-forward expert network and a fraction of outputs from the previous multi-head attention layer that the gating layer routes to each corresponding feed-forward expert network.

Another aspect of the disclosure provides a computer-implemented method that when executed on data processing hardware causes the data processing hardware to perform operations for performing speech recognition using a mixture-of-expert conformer. The operations include receiving a sequence of acoustic frames characterizing an utterance of speech. At each of a plurality of output steps, the operations also include: generating a first higher order feature representation for a corresponding acoustic frame in the sequence of acoustic frames by a first encoder of a multilingual automated speech recognition (ASR) model that includes a first plurality of multi-head attention layers; generating a second higher order feature representation for a corresponding first higher order feature representation by a second encoder of the multilingual ASR model that includes a second plurality of multi-head attention layers; and generating, by a first decoder of the multilingual ASR model, a first probability distribution over possible speech recognition hypotheses based on the second higher order feature representation generated by the second encoder at the corresponding output step and a sequence of N previous non-blank symbols output by a final softmax layer at the corresponding output step. Each multi-head attention layer in the first and second pluralities of multi-head attention layers includes an initial feed-forward network, a multi-headed self-attention layer, a convolution layer, and a final feed-forward network. At least one of the initial feed-forward network or the final feed-forward network of at least one corresponding multi-head attention layer in the second plurality of multi-head attention layers includes a respective mixture-of-experts (MoE) layer, each respective MoE layer including a gating layer and multiple feed-forward expert networks. The gating layer of each respective MoE layer is configured to dynamically route an output from a previous multi-head attention layer at each of the plurality of output steps to a respective pair of feed-forward expert networks among the multiple feed-forward expert networks that includes the highest weights among the multiple feed-forward expert networks at the corresponding multi-head attention layer in the second plurality of multi-head attention layers without routing the output to the other feed-forward expert networks among the multiple feed-forward expert networks.

Implementations of the disclosure may include one or more of the following optional features. In some implementations, each initial feed-forward network in the second plurality of multi-head attention layers includes the respective MoE layer. Each final feed-forward network in the second plurality of multi-head attention layers may include the respective MoE layer. Each feed-forward expert network among the multiple feed-forward expert networks of the respective MoE layer may include a single feed-forward network layer. In some examples, the gating layer of the respective MoE layer does not rely on any language information associated with the sequence of audio frames that characterizes the utterance when dynamically routing the output from the previous multi-head attention layer at each of the plurality of output steps to the respective pair of feed-forward expert networks.

In some implementations, the operations further include determining, by the gating layer of the respective MoE layer, a respective weight for each corresponding feed-forward expert network among the multiple feed-forward expert networks at each of the plurality of output steps based on $g_i=\text{Softmax}(W_l \cdot x)$. Here, x includes the output of the previous layer at the corresponding output step, $W_l$ includes a weight matrix for the gate layer at the corresponding lth multi-head attention layer, and $g_l$ includes the respective weight for the corresponding feed-forward expert network. In some examples, the operations further include determining, based on the output routed by the gating layer from the previous multi-head attention layer, a respective output by each feed-forward expert network in the pair of feed-forward expert networks that include the highest weights and determining, based on a sum of the respective outputs determined by the pair of the feed-forward expert networks that include the highest weights, a MoE output by the respective MoE layer.

In some implementations, the operations further include: receiving, as input to a second decoder of the multilingual ASR model, the first higher order feature representation generated by the first encoder at each of the plurality of output steps; and generating, by the second decoder, at each of the plurality of output steps, a second probability distribution over possible speech recognition hypotheses. In these implementations, the operations may further include generating, based on the second probability distribution over possible speech recognition hypotheses, partial speech recognition results by the second decoder. In some examples: the first decoder and the second decoder each include a corresponding prediction network followed by a corresponding joint network; the corresponding prediction networks of the first and second decoders have a same structure including one of a long short-term memory (LSTM)-based prediction network or a V2 embedding look-up table; and the corresponding joint networks of the first and second decoders include a same structure.

In some examples, generating the second higher order feature representation includes generating the second higher order feature representation without receiving any of the acoustic frames as input. The first encoder may include a causal encoder. The second encoder may include a non-causal encoder. In some implementations, the operations further include jointly training the first encoder and the second encoder on a set of multilingual training utterances using a negative log-likelihood. In some examples, the operations further include training the respective MoE layer on an auxiliary loss to encourage load balancing across the multiple feed-forward expert networks. The auxiliary loss is based on an average gates over all frames for each corresponding feed-forward expert network and a fraction of outputs from the previous multi-head attention layer that the gating layer routes to each corresponding feed-forward expert network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
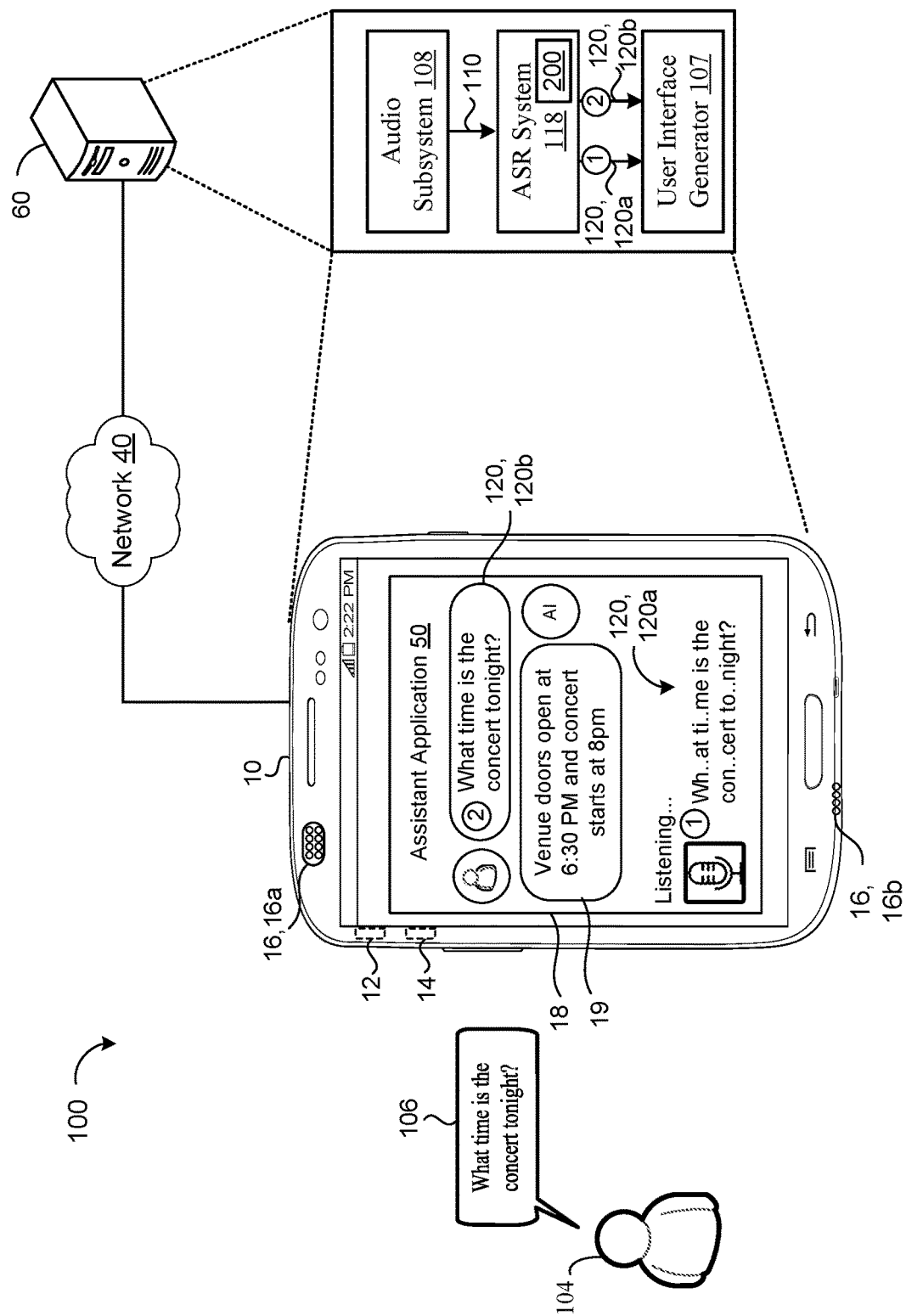
FIG. 1 is a schematic view of an example speech recognition system.

End-to-end (E2E) automatic speech recognition (ASR) models are traditionally structured to operate in either a streaming mode or a non-streaming mode. Conventionally, an E2E ASR model includes an encoder and a decoder as the main components. Applications that involve end-user interaction, like voice-search or on-device dictation, may require the model to perform recognition in a streaming fashion. Here, performing recognition in a streaming fashion refers to the ASR model outputting each word of an utterance as they are spoken with as little latency as possible. Other applications, like offline video captioning, do not require the model to be streaming and can make use of future context to improve performance.

In some scenarios, E2E ASR models are configured to recognize speech from multiple languages (e.g., multilingual ASR models). Here, multilingual ASR models use separate language identification models to perform speech recognition on speech from multiple different languages. Even though multilingual ASR models and language identification models are often used together in downstream tasks (e.g., code-switching and speech translation), the multilingual ASR models and the language identification models are constructed and executed separately. Executing the multilingual ASR model and the language identification model separately increases computational and storage costs associated with performing speech recognition.

Accordingly, implementations herein are directed towards a multilingual ASR model and a method of operating the multilingual ASR model. The method includes generating a first higher order feature representation for a corresponding acoustic frame in a sequence of acoustic frames by a first encoder of a multilingual ASR model that includes a first plurality of multi-head attention layers. The method also includes generating a second higher order feature representation for a corresponding first higher order feature representation by a second encoder of the multilingual ASR model that includes a second plurality of multi-head attention layers. The method also includes generating, by a first decoder of the multilingual ASR model, a first probability distribution over possible speech recognition hypotheses based on the second higher order feature representation generated by the second encoder at the corresponding output step and a sequence of N previous non-blank symbols output by a final softmax layer at the corresponding output step. Each multi-head attention layer in the first and second pluralities of multi-head attention layers includes an initial feed-forward network, a multi-headed self-attention layer, a convolution layer, and a final feed-forward network. Moreover, at least one of the initial feed-forward network or the final feed-forward network of at least one corresponding multi-head attention layer in the second plurality of multi-head attention layers includes a respective mixture-of-experts (MoE) layer, each respective MoE layer including a gating layer and multiple feed-forward expert networks. The gating layer of each respective MoE layer is configured to dynamically route an output from a previous multi-head attention layer at each of the plurality of output steps to a respective pair of feed-forward expert networks among the multiple feed-forward expert networks that includes the highest weights among the multiple feed-forward expert networks at the corresponding multi-head attention layer in the second plurality of multi-head attention layers without routing the output to the other feed-forward expert networks among the multiple feed-forward expert networks.

FIG. 1 depicts an example system whereby a user's 104 manner of interacting with a computing device, such as a user device 10, may be through voice input. The user device 10 (also referred to generally as a device 10) is configured to capture sounds (e.g., streaming audio data) from one or more users 104 within the system 100. Here, the streaming audio data may refer to a spoken utterance 106 by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 with the system 100 into electrical signals and a speech output device (e.g., a speaker) 16, 16b for communicating with an audible audio signal (e.g., as output data from the user device 10). While the user device 10 may implement an array of audio capture devices 16a without departing from the scope of the present disclosure, whereby one or more capture devices 16a in the array may not physically reside on the user device 10, but be in communication with the audio system 16.

In the system 100, an automated speech recognition (ASR) system 118 implements an ASR model 200 and resides on the user device 10 of the user 104 and/or on a remote computing device 60 (e.g., one or more remote servers of a distributed system executing in a cloud-computing environment) in communication with the user device 10 via a network 40. In some examples, the ASR model 200 may be a recurrent neural network-transducer (RNN-T) model. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model receives (e.g., processes) each acoustic frame 110 in the sequence of acoustic frames 110.

In the example shown, the ASR model 200 may perform streaming speech recognition to produce an initial speech recognition result 120, 120a and generate a final speech recognition result 120, 120b by improving the initial speech recognition result 120a. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 performs additional processing on the final speech recognition result 120b whereby the final speech recognition result 120b may be delayed from the initial speech recognition result 120a.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition results 120b in a streaming fashion during time 2. Notably, the ASR model 200 outputs the final speech recognition results 120b in a streaming fashion even though the final speech recognition results 120b improve upon the initial speech recognition result 120a. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?"

This question from the user 104 is a spoken utterance 106 captured by the audio capture device 16a and processed by audio systems 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120a. During time 1, the user interface generator 107 presents, via the digital assistant interface 18, a representation of the initial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition results 120b of the utterance 106 to the user 104 of the user device 10 a streaming fashion such that words, word pieces, and/or individual characters appear on the screen as soon as they are generated by the ASR model 200. In some implementations, the user interface generator 107 replaces the representation of the initial speech recognition results 120a presented at time 1 with the representation of the final speech recognition results 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120a at an earlier time than the final speech recognition results 120b. For instance, as the final speech recognition result 120b is presumed to be more accurate than the initial speech recognition result 120a, the final speech recognition result 120b ultimately displayed as the transcription 120 may fix any terms that may have been misrecognized in the initial speech recognition results 120a. In this example, the streaming initial speech recognition results 120a output by the ASR model 200 are displayed on the screen of the user device 10 at time 1 are associated with low latency and provide responsiveness to the user 104 that his/her query is being processed, while the final speech recognition result 120b output by the ASR model 200 and displayed on the screen at time 2 leverages an additional speech recognition model and/or a language model to improve the speech recognition quality in terms of accuracy, but at increased latency. However, since the initial speech recognition results 120a are displayed as the user speaks the utterance 106, the higher latency associated with producing, and ultimately displaying the final speech recognition results 120b is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
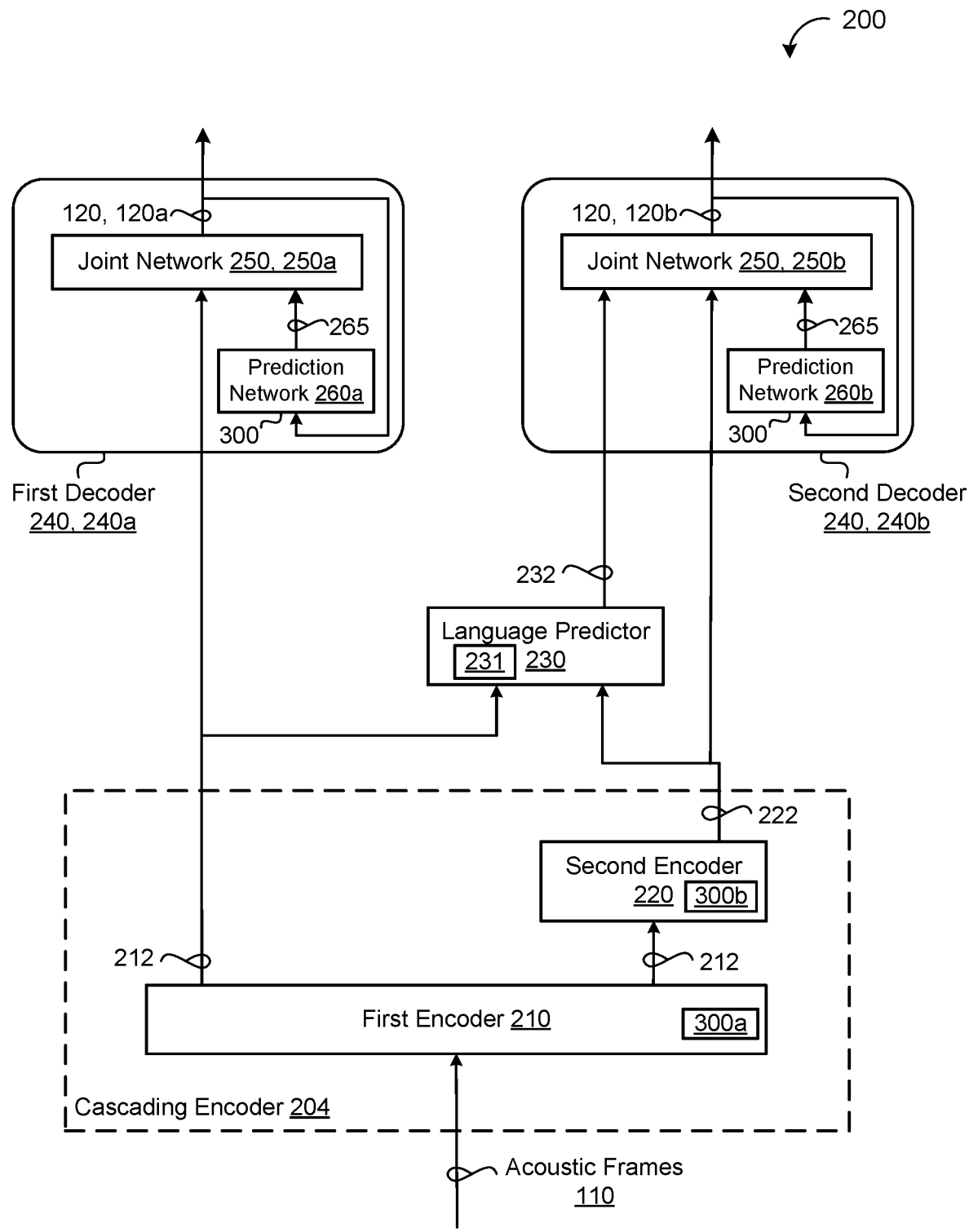
FIG. 2 is a schematic view of an example speech recognition model.

Referring now to FIG. 2, in some implementations, the ASR model 200 includes a cascading encoder 204 and decoders 240. Optionally, the ASR model 200 may include a language ID predictor 230. However, in some scenarios, the ASR model 200 operates without the language ID predictor 230. A first decoder 240, 240*a* may operate in a streaming fashion such that the first decoder 240*a* is configured to generate partial speech recognition results corresponding to the initial speech recognition results 120*a*. On the other hand, a second decoder 240, 240*b* is configured to improve upon initial speech recognition results 120*a* output by the first decoder 240*a*. The second decoder 240*b* improves upon the partial speech recognition results by receiving additional right-context and generating the final speech recognition results 120*b*. The first decoder 240*a* and the second decoder 240*b* each include a corresponding prediction network 260 followed by a corresponding joint network 250. Here, a first prediction network 260, 260*a* and a first joint network 250, 250*a* correspond to the first decoder 240*a* and a second prediction network 260, 260*b* and a second joint network 250, 250*b* corresponds to the second decoder 240*b*. The prediction networks 260*a*, 260*b* have a same structure that includes one of a long short-term memory (LSTM)-based prediction network or a V2 embedding look-up table. Moreover, the corresponding joint networks 250*a*, 250*b* have a same structure. Although, while the component structure is the same for the first and second decoders 240*a*, 240*b*, the respective components of each decoder 240 are unique and may be trained independently from the components of the other decoder 240.

The cascading encoder 204 refers to a model structure where the encoding pathway includes two encoders 210, 220 that cascade such that the output of a first encoder 210 feeds the input of a second encoder 220 prior to decoding. The first encoder 210 and the second encoder 220 may be trained jointly on a set of multilingual training utterances using a negative log-likelihood loss. Here, the first encoder 210 and the second encoder 220 may be cascaded irrespective of the underlying architecture of each encoder. The encoders 210, 220 may each include a stack of multi-head self-attention layers (i.e., plurality of multi-head attention layers) 300. In particular, the first encoder 210 includes a first plurality of multi-head self-attention layers 300, 300*a* and the second encoder 220 includes a second plurality of multi-head self-attention layers 300, 300*b*. In some examples, the first encoder 210 includes a causal encoder whereby the stack of multi-head attention layers include one or more of unidirectional (LSTM) layers, a plurality of conformer layers, or a plurality of transformer layers. For example, the stack of multi-head self-attention layers 300*a* of the first encoder 210 may include twelve (12) conformer layers each having a multi-headed (e.g., eight (8) heads) self-attention mechanism and a convolution kernel size of fifteen (15). Moreover, the first encoder 210 may perform a concatenation operation after a third conformer layer to achieve a time reduction rate of two whereby the resulting 1024-dimensional vectors are transformed by a fourth conformer layer and then projected back to a 512-dimensional vector using another linear transformation. Thereafter, another eight (8) conformer layers are followed by a final normalization layer. Thus, the first encoder 210 may include 110 million parameters. Each layer of the first encoder 210 receives zero right-context (e.g., receives zero future acoustic frames).

The second encoder 220 includes a non-causal encoder whereby the stack of multi-head self-attention layers 300*b* include one of one or more bi-directional LSTM layers, a plurality of conformer layers, or a plurality of transformer layers. For instance, the second encoder 220 may include a 512-dimensional linear projection to transform input feature, followed by five (5) 512-dimensional conformer layers and a final linear normalization layer thereby resulting in 50 million parameters. Here, the second encoder 220 may receive additional right-context, for example, a total right context of fifteen (15) frames whereby each conformer layer receives three (3) frames of right-context.

With continued reference to FIG. 2, the first encoder 210 receives a sequence of d-dimensional feature vectors (e.g., sequence of acoustic frames 110) $x=(x_1, x_2, \ldots, x_T)$, where $x_t \in \mathbb{R}^d$, and generates, at each output step, a first higher order feature representation 212 for a corresponding acoustic frame 110 in the sequence of acoustic frames 110. Similarly, the second encoder 220 is connected in cascade to the first encoder 210, and receives the first higher order feature representation 212 as input, and generates, at each output step, a second higher order feature representation 222 for a corresponding first higher order feature representation 212. In some instances, the second encoder 220 generates the second higher order feature representation 222 without receiving any of the acoustic frames 110 as input. In these instances, the second encoder 220 generates the second higher order feature representations 222 using only the first higher order feature representation 212 as input. Thus, the first higher order feature representations 212 output from the first encoder 210 are fed to the language ID predictor 230 and the first decoder 240*a* while the second higher order feature representations 222 output from the second encoder 220 are fed to the second decoder 240*b* and the language ID predictor 230. However, in configurations where the ASR model 200 does not include the language ID predictor 230, the first higher order feature representation 212 and the second higher order feature representation 222 are fed to the first decoder 240*a* and the second decoder 204*b*, respectively, and are not fed to the language ID predictor 230.

With continued reference to FIG. 2, the first decoder 240*a* includes the first joint network 250*a* and the first prediction network 260*a*. The first joint network 250*a* is configured to receive, as input, a dense representation 265 generated by the first prediction network 260*a* and the first higher order feature representation 212 generated by the first encoder 210 and generate, at each output step, the initial speech recognition result 120*a* for a corresponding acoustic frame 110. Here, the first joint network 250*a* generates the initial speech recognition result 120*a* using the first higher order feature representation 212 and the dense representation 265. The first decoder 240*a* operates in a streaming fashion such that the first decoder 240*a* such that the initial speech recognition results 120*a* may correspond to partial speech recognition results.

In some implementations, the initial speech recognition result 120*a* includes a first probability distribution over possible speech recognition hypotheses. As such, the initial speech recognition result 120*a* may be used interchangeably with the first probability distribution 120*a* over possible speech recognition hypotheses herein. Thus, the first joint network 250*a* may generate, at each output step (e.g., time step), a first probability distribution 120*a* over possible speech recognition hypotheses. Here, the "possible speech recognition hypotheses" correspond to a set of output labels/ symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the first joint network 250a may output a set of values indicative of the likelihood of occurrence of each of a predetermined set of output labels. The set of values can be a vector (e.g., a one-hot vector) and can indicate a second probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The first probability distribution 120a of the first joint network 250a can include a posterior probability value for each of the different output labels. Thus, if there are 100 different output labels representing different graphemes or other symbols, the output of the joint network 250 can include 100 different probability values, one for each output label. The first probability distribution 120a can then be used to select and assign scores to candidate orthographic elements (e.g., graphemes, wordpieces, and/or words) in a beam search process (e.g., by a final Softmax layer of the first joint network 250a (not shown)) for determining the initial speech recognition result 120a. For example, the first joint network 250a may select the N-best possible speech recognition hypotheses having the highest probabilities as output for the initial speech recognition result 120a.

In some implementations, the first prediction network 260a receives, as input, a sequence of non-blank symbols output by the final softmax layer of the first joint network 250a and generates, at each output step, a dense representation 265. That is, the first joint network 250a receives the dense representation 265 for the previous initial speech recognition result 120a and generates a subsequent initial speech recognition result 120a using the dense representation 265.

In some configurations, the language ID predictor 230 of the ASR model 200 is configured to receive, as input, the first higher order feature representation 212 generated by the first encoder 210 at each of the plurality of output steps and the second higher order feature representation 222 generated by the second encoder 220 at each of the plurality of output steps. Moreover, the language ID predictor 230 may generate a concatenation 231 of the first higher order feature representation 212 and the second higher order feature representation 222. Thereafter, the language ID predictor 230 is further configured to generate, at each of the plurality of output steps, a language prediction representation 232 based on the concatenation 231 of the first higher order feature representation 212 and the second higher order feature representation 222. Advantageously, by generating the concatenation 231, the language ID predictor 230 uses a diversity of inputs to generate the language prediction representation 232.

The language prediction representation 232 indicates a corresponding language of the utterance spoken. For instance, because the ASR model 200 is a multilingual ASR model, the spoken utterance may be in any number of languages. Thus, using the concatenation 231, the language ID predictor 230 predicts the corresponding language of the spoken utterance. The language prediction representation 232 may be used for downstream tasks (e.g., code-switching or speech translation) and/or to improve speech recognition results. That is, the second decoder 240b may use the language prediction representation 232 to improve upon the initial speech recognition results 120a generated by the first decoder 240a. In some examples, the language ID predictor 230 generates the language prediction representation 232 on a per-frame basis. In these examples, the spoken utterance may include multiple utterances and the language ID predictor 230 generates the language prediction representation 232 for each acoustic frame 110 in the sequence of acoustic frames 110. For example, for a first portion of the sequence of acoustic frames the language prediction representation 232 may indicate a first language was spoken while for a second portion of the sequence of acoustic frames the language prediction representation 232 indicates a second language was spoken.

With continued reference to FIG. 2, the second decoder 240b includes the second joint network 250b and the second prediction network 260b. In some configurations, the second joint network 250b is configured to receive, as input, a dense representation 265 generated by the second prediction network 260b, the second higher order feature representation 222 generated by the second encoder 220, and the language prediction representation 232 generated by the language ID predictor 230, and generate, at each output step, the final speech recognition results 120b for a corresponding acoustic frame 110. Here, the second joint network 250b generates the final speech recognition result 120b using the second higher order feature representation 222, the language prediction representation 232, and the dense representation 265. In some configurations, the second joint network 250b generates the final speech recognition result 120b without using the language prediction representation 232. In some examples, the second decoder 240b generates a concatenation of the second higher order feature representation 222 and the language prediction representation 232 and uses the concatenation to generate the final speech recognition result 120b.

In some implementations, the final speech recognition result 120b includes a second probability distribution over possible speech recognition hypotheses. As such, the final speech recognition result 120b may be used interchangeably with the second probability distribution 120b over possible speech recognition hypotheses herein. Thus, the second joint network 250b may generate, at each output step (e.g., time step), a second probability distribution 120b over possible speech recognition hypotheses. Here, the "possible speech recognition hypotheses" correspond to a set of output labels/symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the second joint network 250b may output a set of values indicative of the likelihood of occurrence of each of a predetermined set of output labels. The set of values can be a vector (e.g., a one-hot vector) and can indicate a first probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The second probability distribution 120b of the second joint network 250b can include a posterior probability value for each of the different output labels. Thus, if there are 100 different output labels representing different graphemes or other symbols, the output of the second joint network 250b can include 100 different probability values, one for each output label. The second probability distribution 120b can then be used to select and assign scores to candidate orthographic elements (e.g., graphemes, wordpieces, and/or words) in a beam search process (e.g., by a final Softmax layer of the second joint network 250b (not shown)) for determining the final speech recognition result 120b. For example, the second joint network 250b may select the N-best possible speech recognition hypotheses having the highest probabilities as output for the final speech recognition result 120b.

In some implementations, the second prediction network receives, as input, a sequence of non-blank symbols output by the final softmax layer of the second joint network 250b and generates, at each output step, a dense representation 265. That is, the second joint network 250b receives the dense representation 265 for the previous final speech recognition result 120b and generates a subsequent final speech recognition result 120b using the dense representation 265.

In some implementations, the language ID predictor 230 generates more accurate language prediction representations 232 using more acoustic information (e.g., longer audio features). Thus, to utilize all past acoustic frames 110 but still generate the language prediction representations 232 on a per-frame basis, the language ID predictor 230 uses non-parametric statistics pooling. That is, the language ID predictor 230 converts the first higher order feature representation 212 into a concatenation of a mean ($\mu_t$) and standard deviation ($\sigma_t$) of the first higher order feature representation 212. Notably, the language ID predictor 230 determines the mean and standard deviation in a streaming fashion represented by:

$$\mu_t = \frac{\theta(h_{1:t})}{t} \quad (1)$$

$$\sigma_t^2 = \frac{(\theta(h_{1:t}^2) - 2\mu_t\theta(h_{1:t}) + t\mu_t^2)}{t} \quad (2)$$

In Equations 1 and 2, $h_1$ represents the first higher order feature representation 212. After converting the first higher order feature representation 212 into a concatenated vector [$\mu_t$; $\sigma_t$] with statistics pooling, the language ID predictor 230 transforms the concatenated vector into the language prediction representation 232 using two fully connected layers followed by a softmax output layer. As such, the frame-synchronous language ID predictor 230 is efficient for operating in a streaming fashion and only requires a small amount of computational cost during execution.

In some implementations, the ASR model 200 jointly trains the first encoder 210, the second encoder 220, and the language ID predictor 230 on a set of multilingual training utterances. Here, a language ID target token is added as a first token of a corresponding ground-truth transcription of each multilingual training utterance in the set of multilingual training utterance. The language ID target token identifies a language of the corresponding multilingual training utterances. That is, the set of multilingual training utterances may include training utterances in any number of different languages and the language ID target token identifies the actual language (e.g., ground-truth label) of the multilingual training utterance for training purposes.

During training, a training process generates a first loss for the first encoder 210 and a second loss for the second encoder 220 represented by:

$$\mathcal{L}^{rnnt} = \ln P(y \mid x_{1:T}) \quad (3)$$

$$P(y \mid x_{1:T}) = \sum_{\hat{y} \in A(x_{1:T}, y)} \prod_{i=1}^{T+U} P(\hat{y}_i \mid x_{1:t_i}, y_{1:u_i}) \quad (4)$$

In Equations 3 and 4, $\mathcal{L}^{rnnt}$ represents the loss (e.g., Recurrent Neural Network-Transducer loss) of the decoders 240, x represents the sequence of acoustic frames 110, y represents the transcription 120. The ASR model 200 uses two separate decoders 240, and thus, the training loss of the ASR model 200 is represented by:

$$\mathcal{L}^{casc} = \lambda \mathcal{L}^{1st} + (1-\lambda)\mathcal{L}^{2nd} \quad (5)$$

In Equation 5, $\mathcal{L}^{1st}$ represents the loss of the first decoder 240a, $\mathcal{L}^{2nd}$ represents the loss of the second decoder 240b, $\lambda$ represents the weighting factor of the loss of the first decoder 240a, and $(1-\lambda)$ represents the weighting factor of the loss of the second decoder 240b. Moreover, the training process generates a third loss for the language ID predictor 230 represented by:

$$\mathcal{L}^{lid} = l_t \ln\left(\frac{l_t}{z_t}\right) \quad (6)$$

In Equation 6, $\mathcal{L}^{lid}$ represents the third loss for the language ID predictor 230 and $l_t$ represents a one-hot language prediction representation label of t. As such, the training process trains the ASR model 200 using the final training loss according to:

$$\mathcal{L}^{asr+lid} = \mathcal{L}^{casc} + \alpha \mathcal{L}^{lid} \quad (7)$$

In Equation 7, $\alpha$ is a scalar weight for the loss for the language ID predictor 230. Thus, the training process trains the ASR model 200 by minimizing a weighted sum of the first loss, the second loss, and the third loss.

Figure 3:
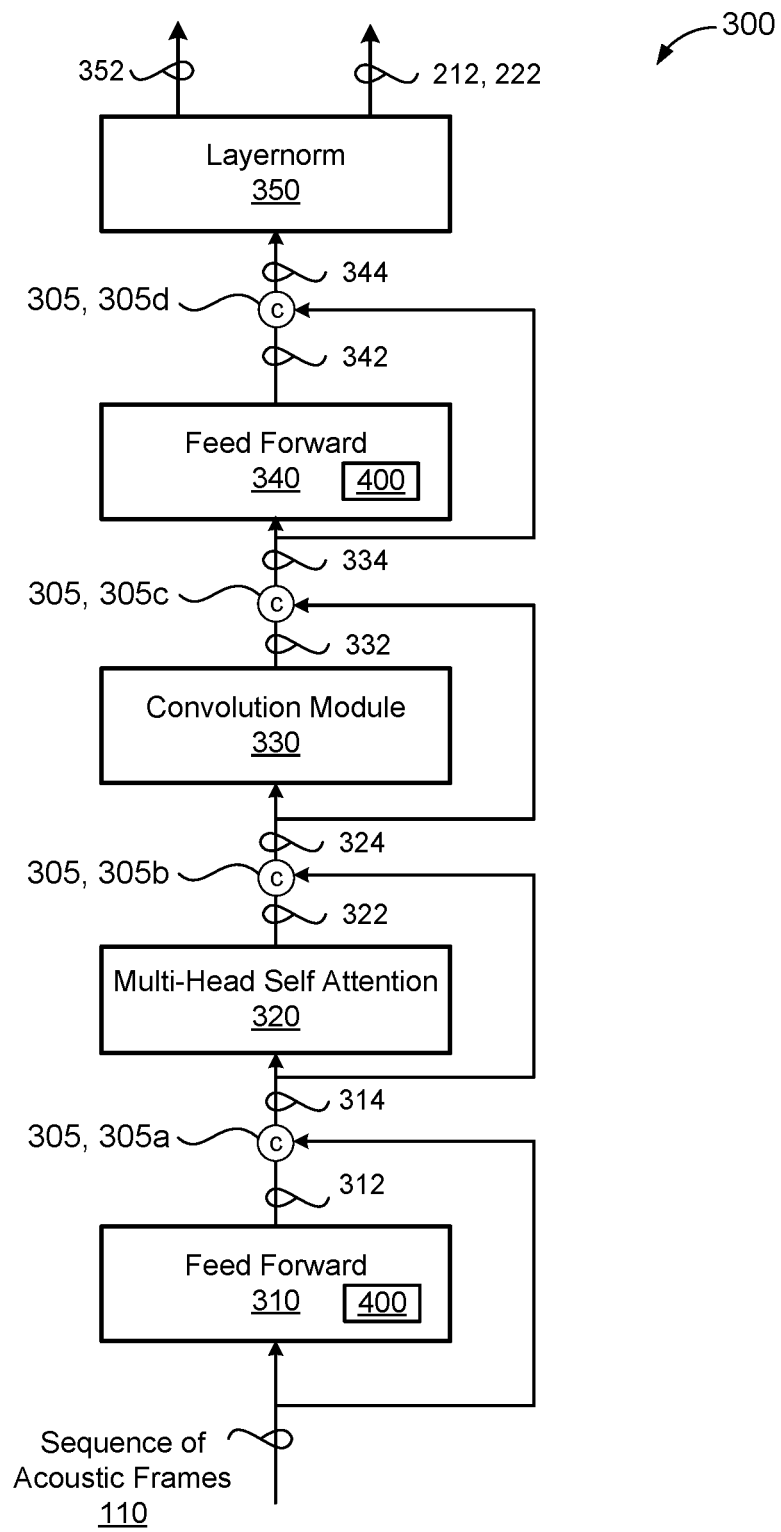
FIG. 3 is a schematic view of an example multi-head self-attention layer from a plurality of multi-head self-attention layers.

FIG. 3 illustrates an example multi-head self-attention layer 300 from the stack of multi-head self-attention layers 300 of the cascading encoder 204 (FIG. 2). The example multi-head self-attention layer 300 may correspond to one of the multi-head self-attention layers 300 from the first encoder 210 (e.g., first plurality of multi-head self-attention layers 300a) and/or the second encoder 220 (e.g., second plurality of multi-head self-attention layers 300b). The example multi-head self-attention layer 300 (also referred to as simply "layer 300") includes an initial feed-forward network 310, a final feed-forward network 340, with a multi-headed self-attention module (i.e., a multi-headed self-attention layer) 320 and a convolution module (i.e., a convolution layer) 330 disposed between the initial feed-forward network 310 and the final feed-forward network 340. The example multi-head self-attention layer 300 also includes a layernorm module 350 and concatenation operators 305, 305a-d. In some examples, at least one of the initial feed-forward network 310 or the final feed-forward network 340 include a respective mixture-of-experts (MoE) layer 400. In one configuration, either the initial feed-forward network 310 or the final feed-forward network 340 includes a respective MoE layer 400. In another configuration, both the initial feed-forward network 310 and the final feed-forward network 340 include a respective MoE layer 400.

The initial feed-forward network 310 is configured to receive, as input, the sequence of acoustic frames 110 and process each acoustic frame 110 in the sequence of acoustic frames 110 corresponding to an utterance to generate a first feed-forward output 312. In some examples, the initial feed-forward network 310 is configured to receive a layer output 352 generated by an immediately preceding multi-head self-attention layer 300 in addition to, or in lieu of, the sequence of acoustic frames 110. Described in greater detail with reference to FIG. 4, when the initial feed-forward network 310 includes the respective MoE layer 400, the initial feed-forward network 310 uses the respective MoE layer 400 to process each acoustic frame 110 in the sequence of acoustic frames 110 corresponding to an utterance and generate the first feed-forward output 312. Next, a first concatenation operator 305a concatenates the first feed-forward output 312 with a corresponding acoustic frame 110 to generate a first concatenated input 314. Subsequently, the multi-head self-attention module 320 receives the first concatenated input 314 and generates a self-attention output 322 based on the first concatenated input 314. A second concatenation operator 305b concatenates the self-attention output 322 with the first concatenated input 314 to generate a second concatenated input 324.

The convolution module 330 is configured to subsample the second concatenated input 324 and generate a convolutional output 332 based on the second concatenated input 324. A third concatenation operator 305c concatenates the convolutional output 332 with the second concatenated input 324 to generate a third concatenated input 334. The final feed-forward network 340 is configured to receive, as input, the third concatenated input 334 and generate a second feed-forward output 342. Described in greater detail with reference to FIG. 4, when the final feed-forward network 340 includes the respective MoE layer 400, the final feed-forward network 340 uses the respective MoE layer 400 to process the third concatenated input 334 and generate the second feed-forward output 342. A fourth concatenation operator 305d concatenates the second feed-forward output 342 with the third concatenated input 334 to generate a fourth concatenated input 344. Finally, the layernorm module 350 processes the fourth concatenated input 344 from the final feed-forward network 340 to generate a corresponding layer output 352 or a corresponding higher order feature representation 212, 222. Mathematically, the example mulita-head self-attention layer 300 transforms input features x (e.g., sequence of acoustic frames 110), using modulation features m, to produce output features y, as follows:

$$\hat{x} = x + r(m) \odot x + h(m) \quad (8)$$

$$\tilde{x} = \hat{x} + \frac{1}{2}FFN(\hat{x}), \tilde{n} = n + \frac{1}{2}FFN(n)$$

$$x' = \tilde{x} + Conv(\tilde{x}), n' = \tilde{n} + Conv(\tilde{n})$$

$$x'' = x' + MHCA(x', n')$$

$$x''' = x' \odot r(x'') + h(x'')$$

-continued
$$x'''' = x' + MHCA(x', x''')$$

$$y = LayerNorm\left(x'''' + \frac{1}{2}FFN(x'''')\right)$$

The example multi-head self-attention layer 300 generates, at each of the plurality of output steps, a layer output 352 which is passed on to the next multi-head self-attention layer 300 in the plurality of multi-head self-attention layers 300. A final multi-head self-attention layer 300 in the plurality of multi-head self-attention layers 300 generates a higher-order feature representation 212, 222 for a corresponding acoustic frame 110 in the sequence of acoustic frames 110 using the layer output 352 from an immediately preceding multi-head self-attention layer 300. Thus, each multi-head self-attention layer 300 prior to the final multi-head self-attention layer 300 generates the layer output 352 which is passed on to the next multi-head self-attention layer 300, and the final multi-head self-attention layer 300 generates the higher-order feature representation 212, 222. For example, the final multi-head self-attention layer 300 of the first encoder 210 generates the first higher-order feature representation 212 while the final multi-head self-attention layer 300 of the second encoder 220 generates the second higher-order feature representation 222.

Figure 4:
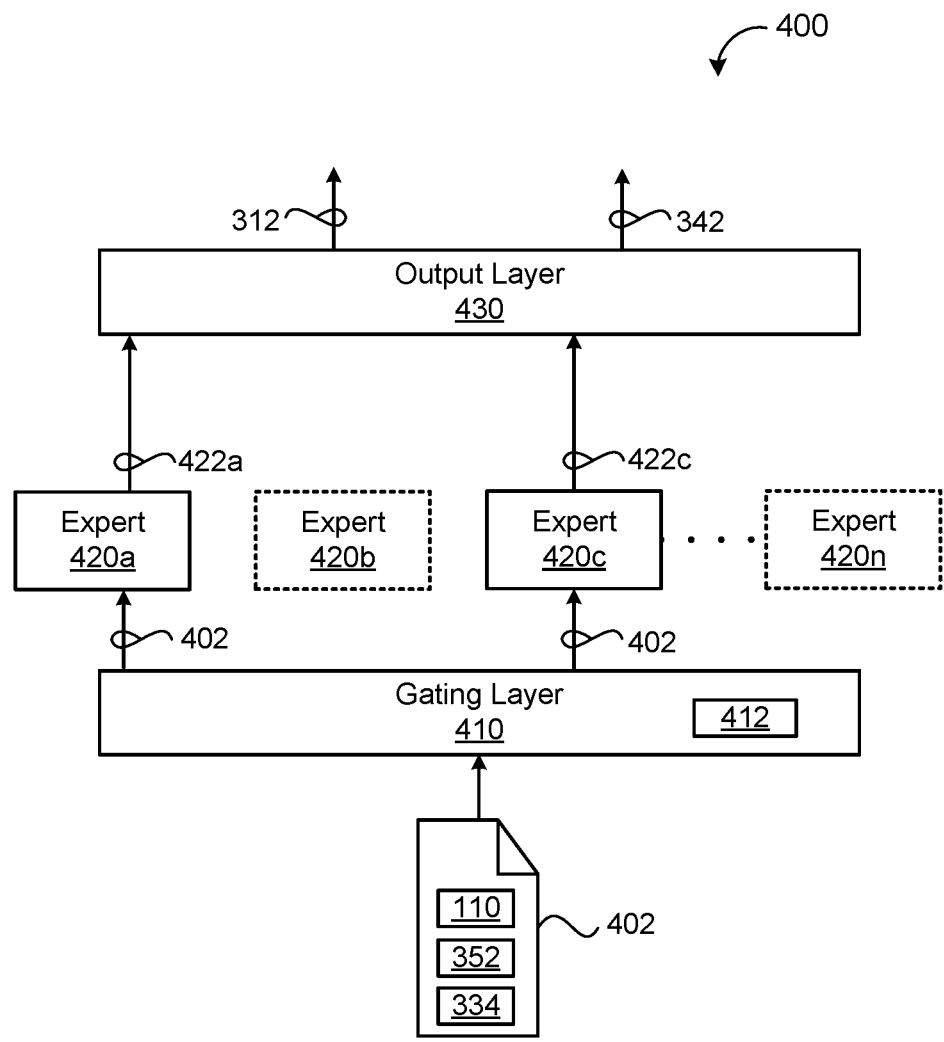
FIG. 4 is a schematic view of an example mixture-of-experts layer.

FIG. 4 illustrates an example MoE layer 400. The MoE layer 400 may correspond to a respective MoE layer 400 from the first plurality of multi-head attention layers 300a (e.g., from the first encoder 210) and/or the second plurality of multi-head attention layers 300b (e.g., from the second encoder 220). Each MoE layer 400 includes a gating layer 410, multiple feed-forward expert networks 420, 420a-n, and an output layer 430. The gating layer 410 is configured to dynamically route an output 402 to a predetermined number of feed-forward expert networks 420 from among the multiple feed-forward expert networks 420. Each output 402 may correspond to a respective acoustic frame 110 from the sequence of acoustic frames 110 such that the gating layer 410 routes each output to a corresponding predetermined number of feed-forward expert networks 420 associated with the respective acoustic frame 110. Each feed-forward expert network 420 includes a respective neural network comprising corresponding parameters. In some examples, each feed-forward expert network 420 among the multiple feed-forward expert networks 420 of the respective MoE layer includes a single feed-forward network layer. As such, during training each respective feed-forward expert network 420 updates the corresponding parameters of the respective feed-forward expert network 420 to specialize in a particular speech recognition task. For instance, training the ASR model 200 to recognize speech from multiple different languages causes subsets of the feed-forward expert networks 420 to update the corresponding parameters particularly for recognizing a certain one of the languages. As a result, each feed-forward expert network 420 is trained to process certain speech inputs better than other feed-forward expert networks 420.

In some examples, the gating layer 410 dynamically routes the output 402 to a respective pair (i.e., two (2)) feed-forward expert networks 420 from among the multiple feed-forward expert networks 420. However, the gating layer 410 may dynamically route the output 402 to any number of the feed-forward expert networks 420 from among the plurality of feed-forward expert networks 420. When the predetermined number of feed-forward expert networks 420 is less than the number of multiple feed-forward expert networks 420, the MoE layer 400 is sparsely activated. That is, since the gating layer 410 only routes the output 402 to the predetermined number of feed-forward expert networks 420, only the predetermined number of feed-forward expert networks 420 process the output 402 while the other feed-forward expert networks 420 remain idle.

The output 402 dynamically routed by the gating layer 410 may correspond to the sequence of acoustic frames 110, the layer output 352 generated by a previous multi-head self-attention layer 300, and/or the fourth concatenated input 344 (FIG. 3). More specifically, when the MoE layer 400 is integrated with the initial feed-forward network 310, the output 402 dynamically routed by the gating layer 410 may correspond to the sequence of acoustic frames 110 or the layer output 352 generated by the previous multi-head self-attention layer 300 in the stack of multi-head self-attention layers 300. Here, the output 402 corresponds to the sequence of acoustic frames 110 for an initial multi-head attention layer 300 from the stack of multi-head attention layers 300 and the output 402 corresponds to the layer output 352 for each other multi-head attention layer 300. Alternatively, when the MoE layer 400 is integrated with the final feed-forward network 340, the output dynamically routed by the gating layer 410 may correspond to the fourth concatenated input 344.

Notably, the gating layer 410 simply routes the output 402 to the predetermined number of feed-forward expert networks 420. That is, the gating layer 410 does not generate any output based on the received output 402, but rather simply forwards (i.e., routes) the received output 402. More specifically, to dynamically route the output 402 the gating layer 410 uses a softmax activation function to model a probability distribution of weights 412 over each corresponding feed-forward expert network 420 from among the multiple feed-forward expert networks 420 based on the output 402. The probability distribution of weights 412 indicates how well each feed-forward expert network 420 is able to process the received output 402. Stated differently, the probability distribution of weights 412 indicates which feed-forward expert network(s) 420 are best suited to generate encodings for the received output 402. Each respective weight 412 from the probability distribution of weights 412 corresponds to one of the feed-forward expert networks 420. In some examples, the gating layer 410 determines each respective weight 412 from the probability distribution of weights 412 according to:

$$g_i = Softmax(W_l \cdot x) \quad (9)$$

In Equation 9, x represents the output 402, $W_l$ represents a weight matrix for the gating layer 410 at the corresponding lth multi-head self-attention layer 300, and g represents the respective weight 412 for a corresponding one of the feed-forward expert networks 420.

In the example shown, the gating layer 410 receives the output 402 and determines, for each respective feed-forward expert network 420, a corresponding weight 412 indicating how capable the respective feed-forward expert network 420 is of processing the output 402. Thereafter, the gating layer 410 is configured to select a predetermined number (i.e., a pair) of feed-forward expert networks 420 that include the highest weights 412 from the probability distribution of weights 412. Continuing with the example shown, the gating layer 410 selects a first feed-forward expert network 420, 420a and a third feed-forward expert network 420, 420c as the predetermined number of feed-forward expert networks 420 that have the highest weights 412 (e.g., denoted by the solid lines). As such, the gating layer 410 dynamically routes the output 402 to the first and third feed-forward expert networks 420a, 420c without routing the output 402 to the other feed-forward expert networks 420 (e.g., a second feed-forward expert network 420, 420b and an nth feed-forward expert network 420, 420n (denoted by the dotted lines)) among the multiple feed-forward expert networks 420. Accordingly, only the first and third feed-forward expert networks 420a, 420c process the output 402 because the gating layer 410 only routed the output 402 to the first and third feed-forward expert networks 420a, 420c. Each respective feed-forward expert network 420 that receives the output 402 dynamically routed by the gating layer 410 processes the output 402 to determine a respective output 422. Continuing with the example shown, the first feed-forward expert network 420a generates a first respective output 422, 422a and the third feed-forward expert network 420c generates a third respective output 422, 422c while the other feed-forward expert networks 420 do not generate any output.

Finally, an output layer 430 receives, as input, the respective outputs 422 generated by each feed-forward expert network 420 and generates, at each of the plurality of output steps, a corresponding feed-forward output 312, 342. When the MoE layer 400 is integrated with the initial feed-forward network 310, the output layer 430 generates a corresponding first feed-forward output 312. On the other hand, when the MoE layer 400 is integrated with the final feed-forward network 340, the output layer 430 generates a corresponding second feed-forward output 342. The output layer 430 generates the corresponding feed-forward output 312, 342 by weighting and summing the respective outputs 422. The output layer 430 sums the respective outputs 422 to generate a MoE output (i.e., first feed-forward output 312 or second feed-forward output 342) 312, 342. In some examples, the output layer 430 sums and weights the respective output 422 according to the corresponding weights 412 of the feed-forward expert network 420 that generated the respective output 422. For instance, the output layer 430 may generate the corresponding feed-forward output 312, 342 according to:

$$y = \sum_{i=1}^{2} g_{l,i} * e_{l,i} \quad (10)$$

In Equation 10, $g_{l,i}$ represents the weight 413 for the top ith feed-forward expert network 420 at the lth layer, $e_{l,i}$ is the corresponding output 422 of the ith feed-forward expert network 420 at the lth layer.

Notably, in some implementations (e.g., when the ASR model 200 does not include the language ID predictor 230), the gating layer 410 does not rely on any language information associated with the sequence of acoustic frames 110 that characterizes the utterance 106 when dynamically routing the output 402. Instead, the gating layer 410 processes the output 402 to determine the probability distribution of weights 412 to determine which feed-forward expert networks 420 to route the output 402 to without receiving or processing any indication of which language is associated with the sequence of acoustic frames 110. For example, the MoE layer 400 may include 100 feed-forward expert networks 420 whereby 2 respective feed-forward expert networks 420 are best suited for processing Spanish speech inputs. In this example, the gating layer 410 may process an output 402 corresponding to a Spanish speech input and determine to route the output to the 2 respective feed-forward expert networks 420 best suited for processing Spanish speech inputs based on determining weights 412 for each feed-forward expert network 420. Simply put, the gating layer 410 determines that the 2 respective feed-forward expert networks 420 best suited for processing Spanish speech inputs should process the output 402 based on acoustic information from the sequence of acoustic frames 110 without receiving any indication that the output 402 corresponds to Spanish speech. Advantageously, the multiple feed-forward expert networks 420 may each specialize (i.e., be trained specifically for) a particular speech recognition task. The particular speech recognition task may be recognizing speech from a certain domain, language, etc. Moreover, by only routing the output 402 to the predetermined number of feed-forward expert networks 420, the MoE layer minimizes the computational and storage costs for processing particular speech inputs.

In some implementations, each MoE layer 400 is trained on an auxiliary loss to encourage load balancing across the multiple feed-forward expert networks 420. Here, load balancing refers to preventing a subset of the multiple feed-forward expert networks 420 from having the greatest weights 412 for most of the speech inputs. Put another way, load balancing ensures that not a subset of the multiple feed-forward expert networks 420 have the greatest weights 412 for all of the speech recognition tasks. The auxiliary loss may be represented by:

$$l_{aux} = \frac{1}{N}\sum_{i=1}^{N}\frac{c_i}{S} \cdot m_i \quad (11)$$

Figure 5:
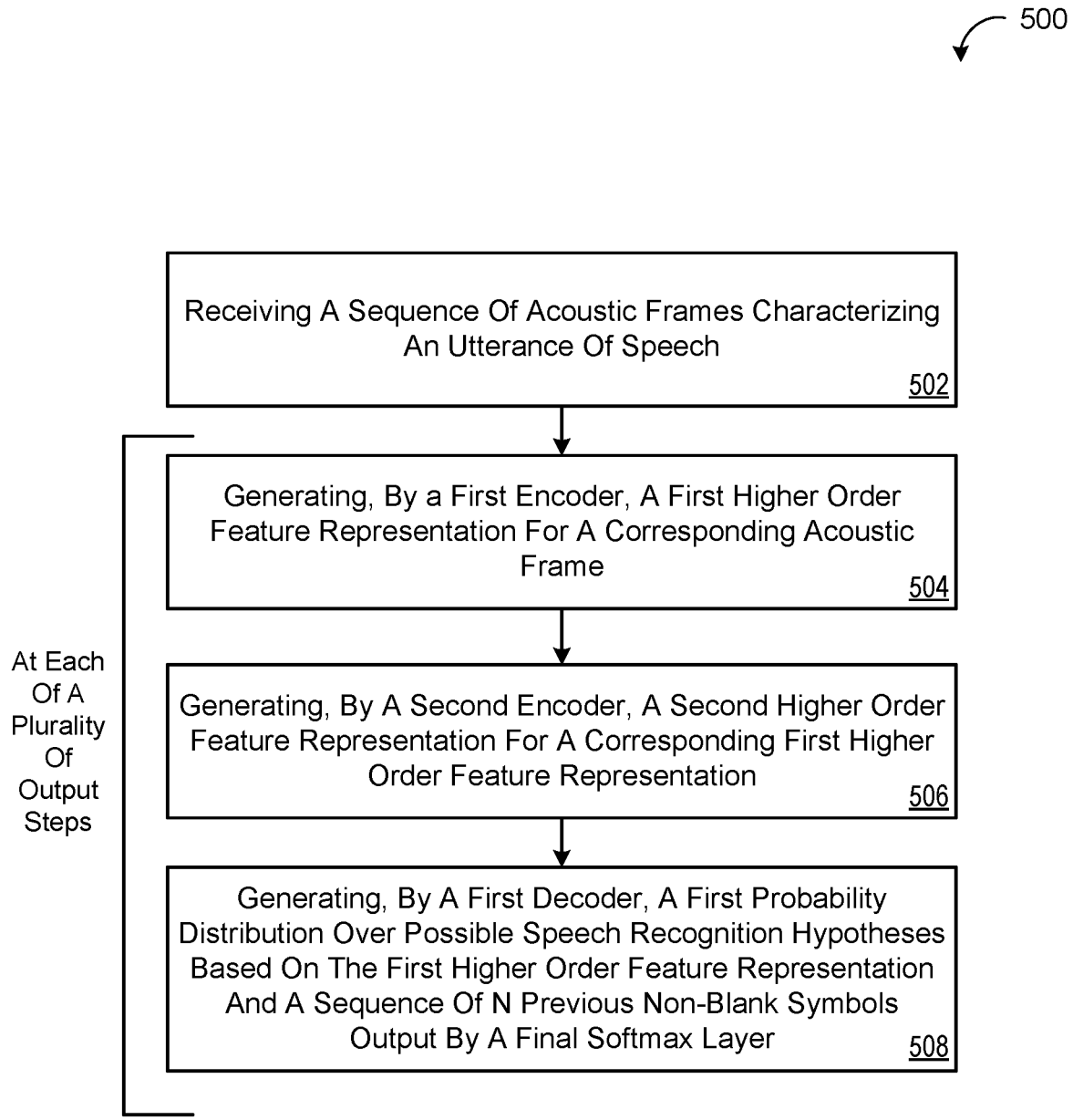
FIG. 5 is a flowchart of an example arrangement of operations for a computer-implemented method of using a mixture-of-experts conformer for streaming multilingual speech recognition.
Figure 6:
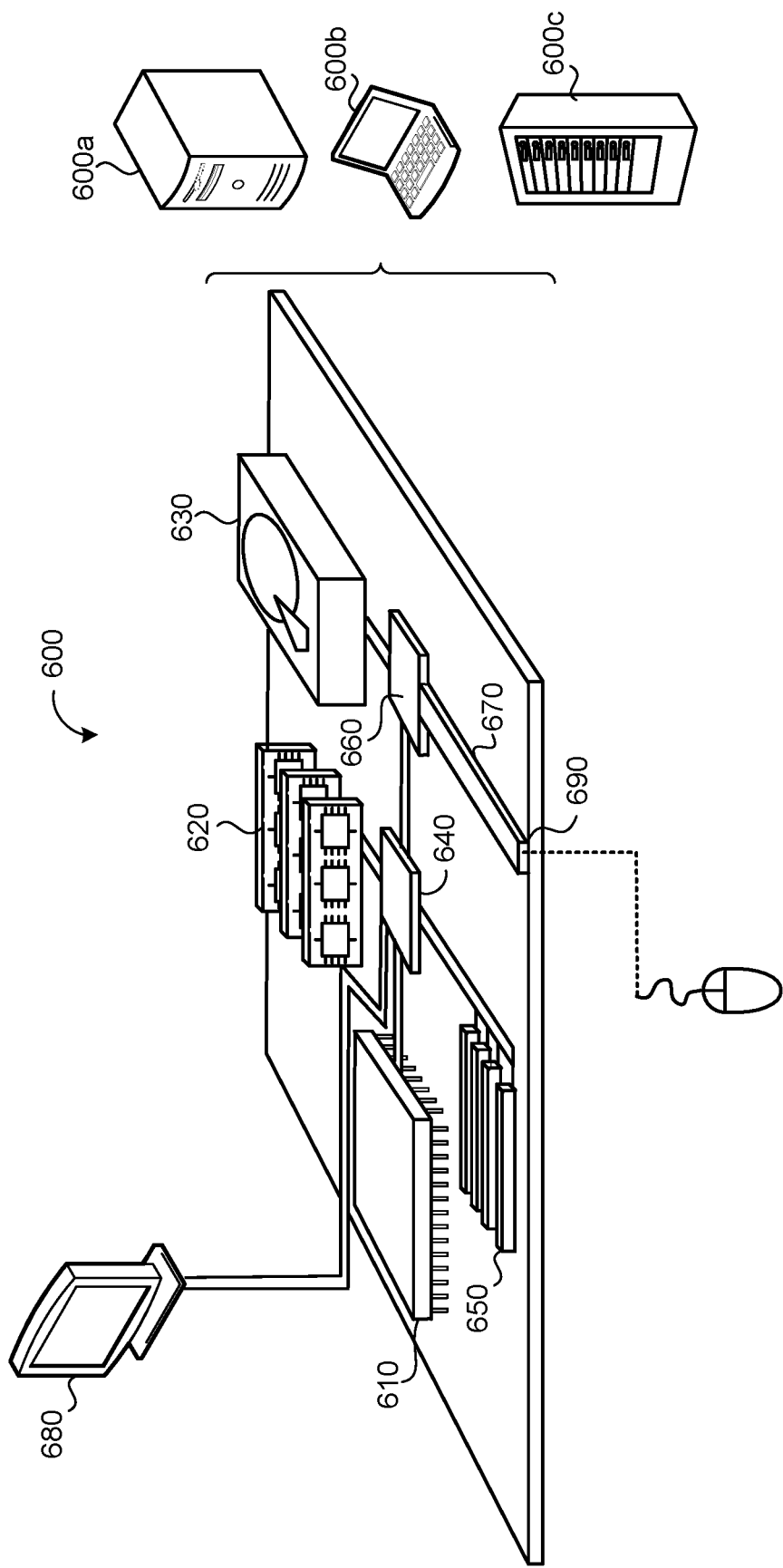
FIG. 6 is a schematic view of an example computing device that may be used to implement the systems and methods described herein.

In Equation 11, $m_i$ represents the average number of times the ith feed-forward expert network 420 is selected (i.e., average gates) over all acoustic frames 110, and $c_i$ is the expert decision count for the ith expert derived from the predetermined number of feed-forward expert networks 420. Thus, the auxiliary loss is based on the average gates over all frames for each corresponding feed-forward expert network and a fraction of outputs from the previous multi-head attention layer that the gating layer 410 routes to each corresponding feed-forward expert network 420. FIG. 5 is a flowchart of an example arrangement of operations for a computer-implemented method 500 for executing a streaming end-to-end multilingual ASR model with mixture-of-expert layers. The method 500 may execute on the data processing hardware 610 (FIG. 6) using instructions stored on the memory hardware 620 (FIG. 6). The data processing hardware 610 and the memory hardware 620 may reside on the user device 10 and/or the remote computing device 60 of FIG. 1 each corresponding to a computing device 600 (FIG. 6).

At operation 502, the method 500 includes receiving a sequence of acoustic frames 110 characterizing an utterance 106 of speech. At each of a plurality of output steps, the method 500 performs operations 504-508. At operation 504, the method 500 includes generating a first higher order feature representation 212 for a corresponding acoustic frame 110 in the sequence of acoustic frames 110 by a first encoder 210 of a multilingual ASR model 200. Here, the first encoder 210 includes a first plurality of multi-head attention layers 300a. At operation 506, the method 500 includes generating a second higher order feature representation 222 for a corresponding first higher order feature representation 212 by a second encoder 220 of the multilingual ASR model 200. Here, the second encoder 220 includes a second plurality of multi-head attention layers 300b. At operation 508, the method 500 includes generating a first probability distribution 120a over possible speech recognition hypotheses by a first decoder 240a of the multilingual ASR model 200. Here, generating the first probability distribution 120a over possible speech recognition hypotheses is based on the first higher order feature representation 212 generated by the first encoder 210 at the corresponding output step and a sequence of N previous non-blank symbols output by a final softmax layer at the corresponding output step. Each multi-head attention layer 300 in the first and second pluralities of multi-head attention layers 300a, 300b includes an initial feed-forward network 310, a multi-headed self-attention layer 320, a convolution layer 330, and a final feed-forward network 340. At least one of the initial feed-forward network 310 or the final feed-forward network 340 of at least one corresponding multi-head attention layer 300 in the second plurality of multi-head attention layers 300b includes a respective MoE layer 400. Moreover, each respective MoE layer 400 includes a gating layer 410 and multiple feed-forward expert networks 420. The gating layer 410 of each respective MoE layer 400 is configured to dynamically route an output 402 from a previous multi-head attention layer 300 at each of the plurality of output steps to a respective pair of feed-forward expert networks 420 among the multiple feed-forward expert networks 420 that includes the highest weights 412 among the multiple feed-forward expert networks 420 at the corresponding multi-head attention layer 300 in the second plurality of multi-head attention layers 300b without routing the output 402 to the other feed-forward expert networks 420 among the multiple feed-forward expert networks 420.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising:
   data processing hardware; and
   memory hardware in communication with the data processing hardware, the memory hardware storing instructions that when executed on the data processing hardware cause the data processing hardware to perform operations corresponding to a multilingual automated speech recognition (ASR) model, the multilingual ASR model comprising:
   a first encoder comprising a first plurality of multi-head attention layers, the first encoder configured to:
      receive, as input, a sequence of acoustic frames characterizing an utterance of speech; and
      generate, at each of a plurality of output steps, a first higher order feature representation for a corresponding acoustic frame in the sequence of acoustic frames;
   a second encoder cascaded to the first encoder and comprising a second plurality of multi-head attention layers, the second encoder configured to:
      receive, as input, the first higher order feature representation generated by the first encoder at each of the plurality of output steps; and
      generate, at each of the plurality of output steps, a second higher order feature representation for a corresponding first higher order feature representation; and
   a first decoder configured to:
      receive, as input, the first higher order feature representation generated by the first encoder at the corresponding output step and a sequence of N previous non-blank symbols output by a final softmax layer at each of the corresponding output steps; and
      generate, at each of the plurality of output steps, a first probability distribution over possible speech recognition hypotheses,
   wherein:
      each multi-head attention layer in the first and second pluralities of multi-head attention layers comprises an initial feed-forward network, a multi-headed self-attention layer, a convolution layer, and a final feed-forward network;
      at least one of the initial feed-forward network or the final feed-forward network of at least one corresponding multi-head attention layer in the second plurality of multi-head attention layers comprises a respective mixture-of-experts (MoE) layer, each respective MoE layer comprising a gating layer and multiple feed-forward expert networks; and
      the gating layer of each respective MoE layer is configured to dynamically route an output from a previous multi-head attention layer at each of the plurality of output steps to a respective pair of feed-forward expert networks among the multiple feed-forward expert networks that comprises the highest weights among the multiple feed-forward expert networks at the corresponding multi-head attention layer in the second plurality of multi-head attention layers without routing the output to other feed-forward expert networks among the multiple feed-forward expert networks.

2. The system of claim 1, wherein each initial feed-forward network in the second plurality of multi-head attention layers comprises the respective MoE layer.

3. The system of claim 1, wherein each final feed-forward network in the second plurality of multi-head attention layers comprises the respective MoE layer.

4. The system of claim 1, wherein each feed-forward expert network among the multiple feed-forward expert networks of the respective MoE layer comprises a single feed-forward network layer.

5. The system of claim 1, wherein the gating layer of the respective MoE layer does not rely on any language information associated with the sequence of audio frames that characterizes the utterance when dynamically routing the output from the previous multi-head attention layer at each of the plurality of output steps to the respective pair of feed-forward expert networks.

6. The system of claim 1, wherein the gating layer of the respective MoE layer is configured to determine a respective weight for each corresponding feed-forward expert network among the multiple feed-forward expert networks at each of the plurality of output steps based on:

$$g_l = Softmax(W_l \cdot x),$$

wherein x comprises the output of the previous layer at the corresponding output step, $W_l$ comprises a weight matrix for the gate layer at the corresponding lth multi-head attention layer, and $g_l$ comprises the respective weight for the corresponding feed-forward expert network.

7. The system of claim 1, wherein:
   each feed-forward expert network in the pair of feed-forward expert networks comprising the highest weights is configured to determine a respective output based on the output routed by the gating layer from the previous multi-head attention layer; and
   the respective MoE layer is configured to determine a MoE output based on a sum of the respective outputs determined by the pair of the feed-forward expert networks that comprise the highest weights.

8. The system of claim 1, further comprising:
   a second decoder configured to:
      receive, as input, the second higher order feature representation generated by the second encoder at each of the plurality of output steps; and
      generate, at each of the plurality of output steps, a second probability distribution over possible speech recognition hypotheses.

9. The system of claim 8, wherein the second decoder is further configured to generate partial speech recognition results based on the second probability distribution over possible speech recognition hypotheses.

10. The system-multilingual ASR model of claim 8, wherein:
    the first decoder and the second decoder each comprise a corresponding prediction network followed by a corresponding joint network;
    the corresponding prediction networks of the first and second decoders have a same structure comprising one of:
       a long short-term memory (LSTM)-based prediction network; or
       a V2 embedding look-up table; and
    the corresponding joint networks of the first and second decoders comprise a same structure.

11. The system of claim 1, wherein the second encoder generates the second higher order feature representation without receiving any of the acoustic frames as input.

12. The system of claim 1, wherein the first encoder comprises a causal encoder.

13. The system of claim 1, wherein the second encoder comprises a non-causal encoder.

14. The system of claim 1, wherein the first encoder and the second encoder are trained jointly on a set of multilingual training utterances using a negative log-likelihood.

15. The system of claim 1, wherein:
the respective MoE layer is trained on an auxiliary loss to encourage load balancing across the multiple feed-forward expert networks; and
the auxiliary loss is based on an average gates over all frames for each corresponding feed-forward expert network and a fraction of outputs from the previous multi-head attention layer that the gating layer routes to each corresponding feed-forward expert network.

16. A computer-implemented method when executed on data processing hardware causes the data processing hardware to perform operations comprising:
receiving a sequence of acoustic frames characterizing an utterance of speech;
at each of a plurality of output steps:
generating, by a first encoder of a multilingual automated speech recognition (ASR) model, a first higher order feature representation for a corresponding acoustic frame in the sequence of acoustic frames, the first encoder comprising a first plurality of multi-head attention layers;
generating, by a second encoder of the multilingual ASR model, a second higher order feature representation for a corresponding first higher order feature representation, the second encoder comprising a second plurality of multi-head attention layers; and
generating, by a first decoder of the multilingual ASR model, a first probability distribution over possible speech recognition hypotheses based on the first higher order feature representation generated by the first encoder at the corresponding output step and a sequence of N previous non-blank symbols output by a final softmax layer at the corresponding output step, wherein:
each multi-head attention layer in the first and second pluralities of multi-head attention layers comprises an initial feed-forward network, a multi-headed self-attention layer, a convolution layer, and a final feed-forward network;
at least one of the initial feed-forward network or the final feed-forward network of at least one corresponding multi-head attention layer in the second plurality of multi-head attention layers comprises a respective mixture-of-experts (MoE) layer, each respective MoE layer comprising a gating layer and multiple feed-forward expert networks; and
the gating layer of each respective MoE layer is configured to dynamically route an output from a previous multi-head attention layer at each of the plurality of output steps to a respective pair of feed-forward expert networks among the multiple feed-forward expert networks that comprises the highest weights among the multiple feed-forward expert networks at the corresponding multi-head attention layer in the second plurality of multi-head attention layers without routing the output to other feed-forward expert networks among the multiple feed-forward expert networks.

17. The computer-implemented method of claim 16, wherein each initial feed-forward network in the second plurality of multi-head attention layers comprises the respective MoE layer.

18. The computer-implemented method of claim 16, wherein each final feed-forward network in the second plurality of multi-head attention layers comprises the respective MoE layer.

19. The computer-implemented method of claim 16, wherein each feed-forward expert network among the multiple feed-forward expert networks of the respective MoE layer comprises a single feed-forward network layer.

20. The computer-implemented method of claim 16, wherein the gating layer of the respective MoE layer does not rely on any language information associated with the sequence of audio frames that characterizes the utterance when dynamically routing the output from the previous multi-head attention layer at each of the plurality of output steps to the respective pair of feed-forward expert networks.

21. The computer-implemented method of claim 16, wherein the operations further comprise:
determining, by the gating layer of the respective MoE layer, a respective weight for each corresponding feed-forward expert network among the multiple feed-forward expert networks at each of the plurality of output steps based on:

$$g_l = Softmax(W_l \cdot x),$$

wherein x comprises the output of the previous layer at the corresponding output step, $W_l$ comprises a weight matrix for the gate layer at the corresponding lth multi-head attention layer, and $g_l$ comprises the respective weight for the corresponding feed-forward expert network.

22. The computer-implemented method of claim 16, wherein the operations further comprise:
determining, based on the output routed by the gating layer from the previous multi-head attention layer, by each feed-forward expert network in the pair of feed-forward expert networks comprising the highest weights, a respective output; and
determining, based on a sum of the respective outputs determined by the pair of the feed-forward expert networks that comprise the highest weights, by the respective MoE layer, a MoE output.

23. The computer-implemented method of claim 16, wherein the operations further comprise:
receiving, as input to a second decoder of the multilingual ASR model, the second higher order feature representation generated by the second encoder at each of the plurality of output steps; and
generating, by the second decoder, at each of the plurality of output steps, a second probability distribution over possible speech recognition hypotheses.

24. The computer-implemented method of claim 23, wherein the operations further comprise generating, based on the second probability distribution over possible speech recognition hypotheses, by the second decoder, partial speech recognition results.

25. The computer-implemented method of claim 23, wherein:

the first decoder and the second decoder each comprise a corresponding prediction network followed by a corresponding joint network;

the corresponding prediction networks of the first and second decoders have a same structure comprising one of:
- a long short-term memory (LSTM)-based prediction network; or
- a V2 embedding look-up table; and the corresponding joint networks of the first and second decoders comprise a same structure.

26. The computer-implemented method of claim 16, wherein generating the second higher order feature representation comprises generating the second higher order feature representation without receiving any of the acoustic frames as input.

27. The computer-implemented method of claim 16, wherein the first encoder comprises a causal encoder.

28. The computer-implemented method of claim 16, wherein the second encoder comprises a non-causal encoder.

29. The computer-implemented method of claim 16, wherein the operations further comprise jointly training the first encoder and the second encoder on a set of multilingual training utterances using a negative log-likelihood.

30. The computer-implemented method of claim 16, wherein the operations further comprise training the respective MoE layer on an auxiliary loss to encourage load balancing across the multiple feed-forward expert networks, the auxiliary loss based on an average gates over all frames for each corresponding feed-forward expert network and a fraction of outputs from the previous multi-head attention layer that the gating layer routes to each corresponding feed-forward expert network.

* * * * *